United States Patent [19]

Tomita

[11] Patent Number: 4,649,451

[45] Date of Patent: Mar. 10, 1987

[54] MAGNETO-OPTICAL RECORDING MEDIUM HAVING ALTERNATELY-LAYERED HIGH AND LOW REFRACTIVE INDEX LAYERS

[75] Inventor: Yasuo Tomita, Yokohama, Japan

[73] Assignee: Canon Kabushiki Kaisha, Tokyo, Japan

[21] Appl. No.: 535,699

[22] Filed: Sep. 26, 1983

[30] Foreign Application Priority Data

Sep. 27, 1982 [JP] Japan ................. 57-168121
Sep. 27, 1982 [JP] Japan ................. 57-168122

[51] Int. Cl.$^4$ ............................................. G11B 5/74
[52] U.S. Cl. ................................. 360/131; 428/900
[58] Field of Search ............... 360/114, 131; 369/13, 369/14; 428/692, 694, 900; 365/122, 121; 350/377

[56] References Cited

U.S. PATENT DOCUMENTS

| | | | |
|---|---|---|---|
| 3,418,483 | 12/1968 | Fan | 350/377 |
| 3,472,575 | 10/1969 | Hunt | 360/131 |
| 3,626,394 | 12/1971 | Nelson et al. | 360/114 |
| 3,851,973 | 12/1974 | Macek | 356/350 |
| 4,412,264 | 10/1983 | Imamura et al. | 360/131 |
| 4,414,650 | 11/1983 | Ohta et al. | 365/121 |
| 4,525,028 | 6/1985 | Dorschner | 350/377 |

FOREIGN PATENT DOCUMENTS 0117345  9/1981  Japan ................. 360/114

OTHER PUBLICATIONS

T. N. Kennedy, Magnetic Recording Disk with Buried Servo Layer, Dec. 1980, 2949–2950.

Primary Examiner—John H. Wolff
Assistant Examiner—Andrew L. Sniezek
Attorney, Agent, or Firm—Fitzpatrick, Cella, Harper & Scinto

[57] ABSTRACT

A magneto-optical recording medium is disclosed which comprises a substrate, a magnetic thin film and a multi-layered dielectric layer for regulating the reflection factor of the magnetic thin film.

10 Claims, 13 Drawing Figures

MAGNETO-OPTICAL RECORDING MEDIUM HAVING ALTERNATELY-LAYERED HIGH AND LOW REFRACTIVE INDEX LAYERS

BACKGROUND OF THE INVENTION

1. Field of the Invention

The present invention relates to a magneto-optical recording medium in which information can be recorded magnetically and from which the magnetic information can be read out making use of a magneto-optic effect.

2. Description of Prior Art

In recent years erasable or rewritable magneto-optical discs have been proposed as a new attractive recording medium. It is expected that the new recording medium will supersede rapidly the conventional unerasable fixed-type optical discs.

The magneto-optical disc proposed as the promising new recording medium is featured by the provision of a perpendicularly magnetized thin film layer formed on a substrate member made of, for example, glass or resin. The magnetic thin film has its axis of easy magnetization orientated in the direction perpendicular to the plane of the disc. To write information in the disc, one uses a laser. By irradiating the magnetic thin film layer with the laser beam the information is thermo-magnetically recorded in the disc. For reproducing the magnetic information stored in the recording medium, one uses the reflected light from the magnetic thin film. The reproduction is attained by detecting the rotation of the plane of polarization (Kerr rotation) of the reflected light caused by magneto-optical Kerr effect.

However, the magneto-optical recording medium as mentioned above has a problem that the S/N ratio (Signal-to-Noise ratio) attainable in reproducing information is too low to be satisfactory. This problem of unsatisfactory S/N ratio is mainly attributable to the following facts:

The magnetic thin film now being used as the perpendicularly magnetized thin layer of the recording disc is able to produce only a very small Kerr rotation angle which is in the order of about 0.1° (degree). In addition, the power of light beam usable for the reproduction must be limited so as not be have the stored magnetic information lost by the reproducing light beam.

As a solution to the problem it has already been proposed to apply a film of dielectric material on the magnetic thin film of the recording disc. The dielectric film has an effect to reduce the reflection factor of the recording medium and thereby apparently increase the Kerr rotation angle, which leads to improvement in the S/N ratio. This solution is disclosed, for example, in Japanese Patent Application laid-open No. 156,943/1981. An example of the magneto-optical recording medium designed according to the solution is shown in FIG. 1 of which a description will be made hereinafter to assist in better understanding of the present invention.

Referring to FIG. 1, the prior art magneto-optical recording medium comprises a substrate 1, a magnetic thin film layer 2 and a reflection factor regulating layer 3. The magnetic thin film layer 2 is formed on the substrate 1 employing a suitable known technique such as vacuum deposition or spattering. The top regulating layer 3 on the magnetic thin film 2 is formed of a dielectric substance. Reading of the stored information for reproduction is carried out by projecting a reading light A on the recording medium from above and detecting the Kerr rotation of the reflected light from the recording medium. FIG. 2 illustrates the state of polarization of the reflected light. In FIG. 2, x-axis is in the polarization direction of the incident light and y-axis orthogonal to x-axis is in the Kerr effect polarization direction. As shown in FIG. 2, the reading light A is polarized into an elliptically polarized light having a component in the Kerr effect polarization direction (y-axis). The major axis of the ellipse and the x-axis form an angle θk which is called Kerr rotation angle. The Kerr rotation angle θk is given by:

$$\theta k = \frac{|ry|}{|rx|} \cos \delta \quad (1)$$

wherein, rx is Fresnel reflection factor in the incident light polarization direction of the reflected light;

ry is Kerr reflection factor of the orthogonal component produced by Kerr effect; and δ is phase difference between rx and ry.

To detect the reflected light there may be used a photo detector having a current multiplying function such as avalanche photo diode (A P D) or a photo detector having no current multiplying function such as P I N photo diode. In the former case, the S/N ratio of the reproduced information signal is proportional to $\sqrt{R} \cdot \theta k$ wherein R is the power reflection factor of the recording medium. Therefore, from the above equation (1) and $\sqrt{R} = |rx|$, the S/N ratio in reproduction is given by:

$$(S/N) \alpha |ry| \cos \delta \quad \ldots (2)$$

Since $|ry| \alpha (1-R)$, it will be understood that the S/N ratio in reproduction can be improved by decreasing the reflection factor of the recording medium.

In the latter case where a photo detector having no current multiplying function such as PIN photo diode is used, the relationship between reflection factor and S/N ratio is not so simple as described above for the former case. However, in the latter case also it is known that the S/N ratio in reproduction can be improved by decreasing the reflection factor of the recording medium and adjusting it to the optimum value.

In the example of the prior art shown in FIG. 1, the regulating layer 3 is formed on the magnetic thin film layer 2 by vacuum deposition of dielectric substance having a high refractive index such as ZnS or TiO$_2$ in order to reduce the reflection factor of the recording medium thereby improving the S/N ratio in reproduction of information. Obviously a satisfactory S/N ratio can be obtained only when the reflection factor is sufficiently decreased by the provision of the dielectric regulating layer 3. In order to attain it, the layer 3 of high refractive substance must be formed as a high density film layer. This means that when the dielectric regulating layer 3 is formed, the whole of magnetic thin film layer 2 and substrate 1 must be heated to a high temperature. However, as well-known to those skilled in the art, the magnetic characteristics of the magnetic film 2 are generally deteriorated by such high temperature heating. Therefore, the use of such a high temperature is undesirable. Especially, in the case of amorphous material such as GdTbFe, such high temperature heating results in crystallization of the amorphous material by which the magnetic property of the material is greatly changed undesirably. For this reason, it has been deemed undesirable to sufficiently heat the substrate when the dielectric regulating layer is formed. Therefore, it has been impossible to obtain a desired high refractive index for the regulating layer 3. Consequently the magneto-optical recording medium according to the prior art as shown in FIG. 1 has only a limited improvement in S/N ratio although it is provided with a reflection factor regulating layer. This is an important drawback of the above-mentioned solution.

As another solution to the above problem it has already been proposed to form a very thin magnetic film on a film layer of a metal such as Cu or Al. The film thickness permissible for the magnetic film is, at the largest, about the penetration depth of the reading light. This second solution is based on the finding that the Kerr rotation angle can be increased making use of Faraday effect by the multiple reflection within the magnetic thin film. This solution is disclosed, for example, in British laid-open Patent No. 2,094,540. FIG. 3 shows an example of the prior art magneto-optical recording medium designed according to the second solution.

Referring to FIG. 3, the recording medium comprises a substrate 11, a metal film layer 12 formed on the substrate 1 by vacuum deposition or other suitable known technique, and a magnetic thin film layer 13 formed on the metal film layer 12 by vacuum deposition or spattering. Again, A denotes a reading light which is projected on the recording medium from above. To reproduce the information previously stored in the recording medium the Kerr rotation of the reflected light is detected in the same manner as above. In this prior art recording medium, the light A transmitted through the top magnetic thin film layer 13 is reflected on the interface between the magnetic layer 13 and the metal layer 12. Further, the reflected light is multiple-reflected in the magnetic film layer 13 so that the Kerr rotation angle of the reflected light can be increased by Faraday effect and therefore the S/N ratio in reproduction can be improved accordingly.

However, the prior art recording medium as shown in FIG. 3 also has some drawbacks.

Firstly the reflecting power of the interface between magnetic layer 13 and metal layer 12 is not sufficiently high for producing a desired effect to adequately increase the Kerr rotation. Therefore, improvement in S/N ratio attainable by it is not so great.

Secondly, the metal film layer 12 undesirably acts as a heat sink. This reduces the recording sensitiveness for thermo-magnetic writing of information in the recording medium. Especially, the writing property of the recording medium for high frequency signals is greatly deteriorated by the metal layer 12.

Because of these drawbacks of the prior art recording medium a further improvement in the S/N ratio is highly desired.

BRIEF SUMMARY OF THE INVENTION

Accordingly it is an object of the present invention to provide a magneto-optical recording medium from which the recorded information can be read out with a highly improved S/N ratio for reproduction.

It is another object of the invention to provide a magneto-optical recording medium which can be prepared without any deterioration of magnetic properties and from which the recorded information can be read out with a high reproduction S/N ratio.

It is a further object of the invention to provide a magneto-optical recording medium which enables to read out the recorded information for reproduction with a highly improved S/N ratio without the recording sensitiveness for writing information being reduced.

According to the present invention these objects are attained by a magneto-optical recording medium comprising a substrate, a magnetic thin film layer and a dielectric multi-layered film provided to regulate the reflection factor of the magnetic thin film layer.

Other and further objects, features and advantages of the invention will appear more fully from the following description.

DESCRIPTION OF PREFERRED EMBODIMENTS

Figure 4:
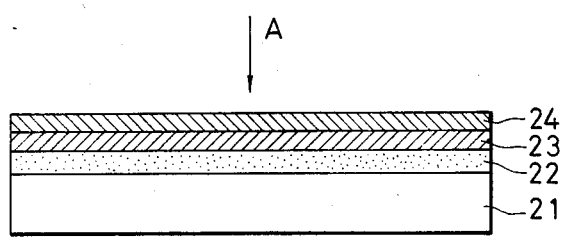
FIG. 4 is a schematic sectional view showing the structure of a magneto-optical recording medium according to the present invention.

A basic composition of the magneto-optical recording medium according to the present invention is schematically shown in FIG. 4. The recording medium comprises a substrate 21, a magnetic thin film 22 formed on the substrate 1, a dielectric regulating layer 23 and an alternately-layered dielectric layer 24 applied on the magnetic thin film 22 in layers. The structure of the alternately-layered dielectric layer 22 may be varied depending on the refractive index of the medium used for the magnetic thin film 22 and the dielectric regulating layer 23. The function of the alternately-layered dielectric layer 24 is to enhance the effect of multi-interference to the reading light A thereby further increasing the Kerr rotation angle. Therefore, even when the refractive index of the regulating layer 23 is not sufficiently high for the reason as previously described in connection with the prior art, the Kerr rotation angle can be increased adequately by the alternately-layered dielectric layer 24 and the object of improvement in S/N ratio in reproduction can be attained by it.

Figure 5A:
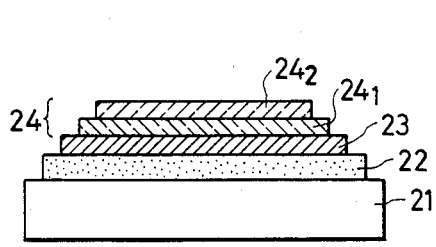
FIGS. 5A and 5B are schematic sectional views showing first and second embodiments of the invention.
Figure 5B:
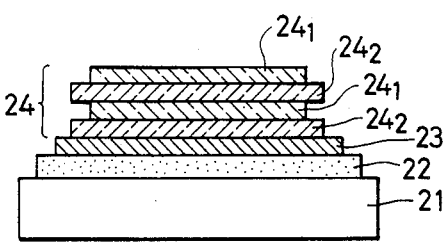

FIGS. 5A and 5B schematically show first and second embodiment of the magneto-optical recording medium according to the invention.

In the first embodiment shown in FIG. 5A, the substrate 21 is made of glass or resin and the magnetic thin film layer 22 on the substrate is formed of amorphous GdTbFe. The layer 23 on the magnetic thin film 22 is a dielectric regulating layer of SiO. According to the feature of the present invention, an alternately-layered dielectric layer 24 is applied on the regulating layer 23. The alternately-layered dielectric layer 24 is composed of two layers, namely, a $MgF_2$ film layer $24_1$ and a ZnS film layer $24_2$ each having an optical film thickness of $\lambda/4$ (wherein $\lambda$ is wavelength of the reading light).

In the second embodiment shown in FIG. 5B, the alternately-layered dielectric layer 24 is composed of four film layers, namely, two $MgF_2$ film layers $24_1$ and two ZnS film layers $24_2$ alternately layered. Other layers 21, 22 and 23 of the second embodiment correspond to those of the first embodiment.

Figure 6:
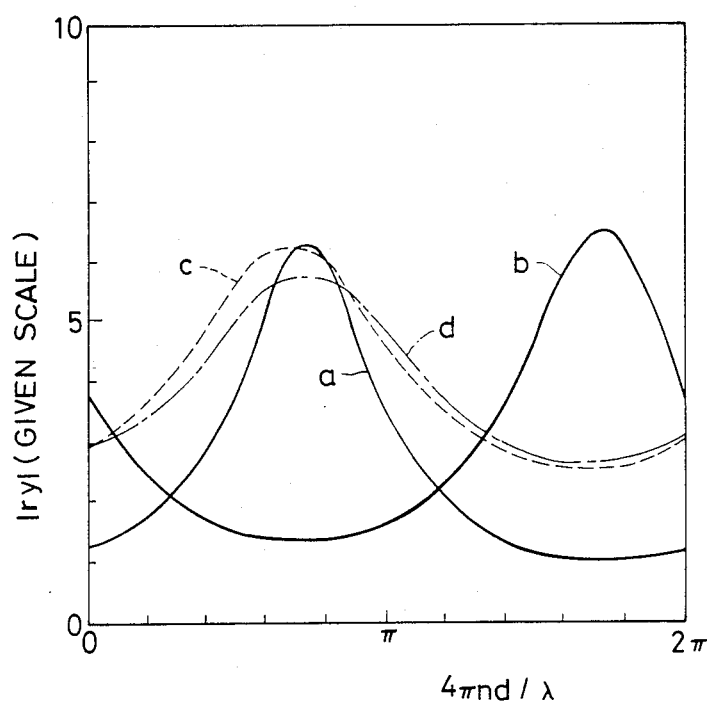
FIG. 6 illustrates the dependence of Kerr reflection factor upon the thickness of dielectric regulating layer in the above prior art recording medium and in the first and second embodiments of the invention.

The value $|r\gamma|$ of Kerr reflection factor obtainable from the above embodiments depends on the film thickness d of the dielectric regulating layer. FIG. 6 shows this dependence of Kerr reflection factor on film thickness. In FIG. 6, n is the refractive index of the dielectric regulating layer. For the sake of comparison, relation curves c and d obtained from the prior art structures provided with a dielectric regulating layer of SiO (n~2.0) or ZnS (n~2.35) without any alternately-layered dielectric layer on the regulating layer are also shown in FIG. 6 together with relation curves a and b obtained from the structures according to the invention. The structures of the magneto-optical recording medium from which the relation curves a, b, c and d were obtained, are as follows:

a: air/ZnS/$MgF_2$/SiO/GdTbFe (first embodiment)
b: air/$MgF_2$/ZnS/$MgF_2$/ZnS/SiO/GdTdFe (second embodiment)
c: air/ZnS/GdTbFe
d: air/Sio/GdTbFe.

From FIG. 6 it is clearly seen that the Kerr effect can be enhanced by applying a dielectric alternately-layered layer 24 on a dielectric reflection factor regulating layer 23 even when the regulating layer is formed of the same dielectric substance as used in the prior art ones. In the prior art structure without such an alternately-layered dielectric layer, the regulating layer is required to have a very high refractive index which is practically impossible to realize for the reasons previously described. According to the invention, the strict requirement for the regulating layer can be moderated to a great extent by the provision of the alternately-layered dielectric layer 24. Thus, the problem involved in the prior art magneto-optical recording medium as mentioned above is solved according to the invention.

The optimum optical film thickness of the dielectric regulating layer in the recording medium according to the invention is variable according to the arrangement of high refractive film and low refractive film in the alternately-layered dielectric layer provided on the regulating layer. FIG. 6 shows that $\lambda/4$ (2m−1) or $\lambda/2$ (2m−1) wherein m=1, 2, 3, ... can be selected as the optimum film thickness. However, the magnitude of deviation of the film thickness from the optimum value relative to the manufactural error depends not on the relative value of the variation of the film thickness but on the absolute value of the variation. Considering this fact it isadvisable that the regulating layer be as thin as possible. Therefore, preferred film thickness of the dielectric regulating layer is about $\lambda/4$ or $\lambda/2$. Concretely speaking, when there is used, as the light source of the reading light, such a semiconductor laser the wavelength of which $\lambda$ is ~820 nm or He-Ne laser or $Ar^+$ laser having a shorter wavelength than that, man can select a value less than 0.2 $\mu$m as the optimum film thickness of the regulating layer which is easy to manufacture.

The alternately-layered dielectric layer applied onto a thin dielectric regulating layer according to the invention serves also as a protecting layer for the underlaying magnetic layer. It protects the magnetic thin layer against abrasion and other mechanical damage.

Practically speaking it is advisable that the magnetic thin film layer be protected more surely by a particular protecting layer. An embodiment provided with such a particular protecting layer is shown in FIG. 7A as the third embodiment of the invention.

Figure 7A:
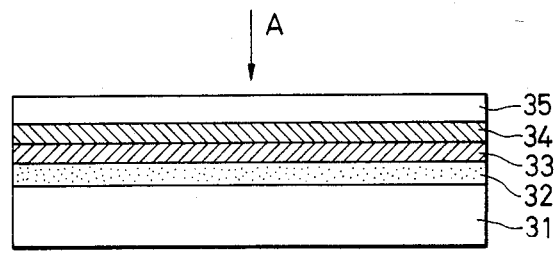
FIGS. 7A and 7B show third and fourth embodiments of the invention.

Referring to FIG. 7A, a transparent protecting layer 35 formed of glass, resin or the like is additionally provided on an alternately-layered dielectric layer 34. Other parts of the structure of the third embodiments correspond to those of the structure shown in FIG. 4. Again, A denotes a reading light beam. 31 is a substrate, 32 is a magnetic thin film layer and 33 is a dielectric regulating thin layer. In making the third embodiment, the transparent protecting layer 35 may be bonded to the layer 34 by means of adhesive on other suitable means after the main structure including the substrate 31 and layers 32, 33, 34 has completely been formed as shown in FIG. 4. However, in this case, the alternately-layered dielectric layer 34 must be designed, taking into account the presence of the transparent protecting layer 35, in such manner that the reflection factor of the magnetic layer may be reduced as compared with the embodiments without such a particular protecting layer 35.

Figure 7B:
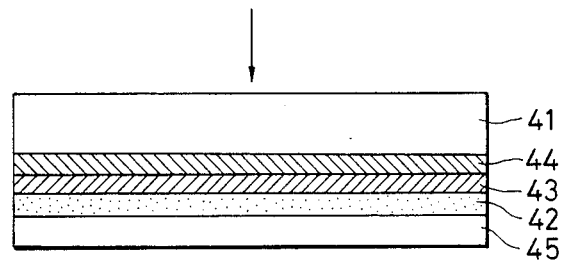

FIG. 7B shows a fourth embodiment of the invention, which is a modification of FIG. 7A embodiment.

In this fourth embodiment, a transparent substrate 41 is used on which an alternately-layered dielectric layer 44, a dielectric regulating layer 43 and a magnetic thin film layer 42 are sequentially formed by vacuum deposition thin film layer 42 are sequentially formed by vacuum deposition or spattering in the named sequence of layer. Thereafter, a protecting layer 45 is bonded to the magnetic thin layer 42 by means of suitable bonding agent. When this embodiment is used, the reading light A must be projected on the recording medium from the side of transparent substrate 41 and the composition of the alternately-layered dielectric layer must be determined, taking the transparent substrate into account, in such manner that the layer has the lowest reflection factor.

In the above embodiments there has been used amorphous GdTbFe as the material for magnetic thin film. However, it is to be understood that the magnetic thin film may be formed employing other amorphous or crystalline materials. For example, it may be an amorphous magnetic film formed of TbFe, GdDyFe, TbDyFe, GdTbFeCo or TbFeCo, or a crystalline magnetic film formed of MnB, MnBiCu or CoCr. Similarly, the dielectric material useful for forming the regulating layer and the alternately-layered layer is never limited to those particularly described above. For example, $TiO_2$, $ZrO_2$, $CeO_2$, $Sb_2O_3$, $ThO_2$, $SiO_2$ etc. are also useful and the same good result as in the above embodiments can be obtained. It is also to be understood that various changes and modifications are possible in the composition and arrangement of the multi-layered dielectric layer including dielectric regulating layer and alternately-layered dielectric layer.

Figure 8:
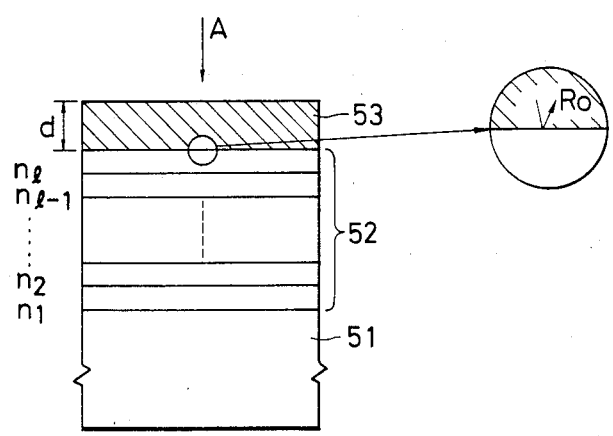
FIG. 8 shows a fifth embodiment of the invention.

FIG. 8 shows a fifth embodiment of the invention.

In this embodiment, a multi-layered dielectric layer 52 is formed on the backside surface of a magnetic thin film layer 53 as viewed in the direction of the reading light A. This arrangement has an effect to increase the reflection factor of the magnetic film backside surface to the reading light and thereby increase the Kerr rotation angle making use of Faraday effect produced by the multiple reflection of the light within the magnetic thin film layer as previously mentioned in the description of prior art.

In making the recording medium shown in FIG. 8, at first a determined number of dielectric thin films each having an optical film thickness of λ/4 (λ is the wavelength of the reading light A) are formed successively one on another on a substrate 51 which may be, for example, glass or resin. These thin films constitute together the multi-layered dielectric layer 52. Then, the magnetic thin film layer 53 is formed on the dielectric layer 52 by vacuum deposition or spattering of crystalline material such as MnBi or MnCuBi or amorphous material such as GdTbFe, GdTbFeCo or TbFeCo. If the multi-layered dielectric layer 52 is constituted of a certain number l of individual thin dielectric films and if the first film, the second film . . . and the l-th film counted from the substrate side have refractive index of $n_1$, $n_2$ . . . and $nl$ respectively, and the reading light A is a normal incident light, then the reflection factor Ro at the interface between the magnetic thin film layer 53 and the multi-layered dielectric layer 52 may be given by:

$$Ro = \left| \frac{P_l - Q_l}{P_l + Q_l} \right|^2 \qquad (3)$$

wherein, $$P_l = \begin{cases} n_s(n_2 \cdot n_4 \ldots n_{l-1})^2 Nm & (l: \text{odd number}) \\ (n_1 \cdot n_3 \ldots n_{l-1})^2 Nm & (l: \text{odd number}) \end{cases}$$

$$Q_l = \begin{cases} (n_1 \cdot n_3 \ldots n_l)^2 & (l: \text{odd number}) \\ n_s(n_2 \cdot n_4 \ldots n_l)^2 & (l: \text{even number}) \end{cases}$$

wherein, ns is the refractive index of the substrate 52 and Nm is the refractive index of the magnetic film 53.

We calculated the reflection factor Ro on the substrate side of some embodiments of the present invention using the above equation (3). In the embodiments, the substrate 51 was made of glass, and the magnetic thin film 53 was formed of GdTeFe. The multi-layered dielectric layer 52 was constituted of N sets of alternate layers of ZnS ($n_1 = 2.35$) and MgF$_2$ ($n_2 = 1.38$) each having a film thickness of λ/4. The result of the calculation is given in the following table, Table 1.

TABLE 1

| Number of alternate layers (N) | Reflection factor on the substrate side (Ro) |
|---|---|
| 1 | 0.734 |
| 2 | 0.899 |
| 3 | 0.964 |
| 4 | 0.988 |
| 5 | 0.996 |

From the above result it is seen that according to the invention a reflection factor on the substrate side more than 95% can be obtained when N ≧ 3.

Figure 1:
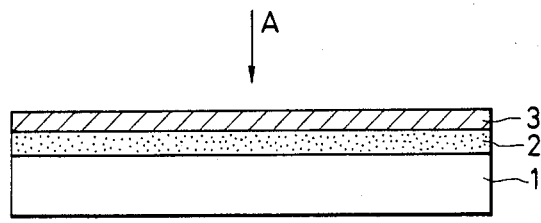
FIG. 1 is a schematic sectional view of the structure of a magneto-optical recording medium according to the prior art.
Figure 2:
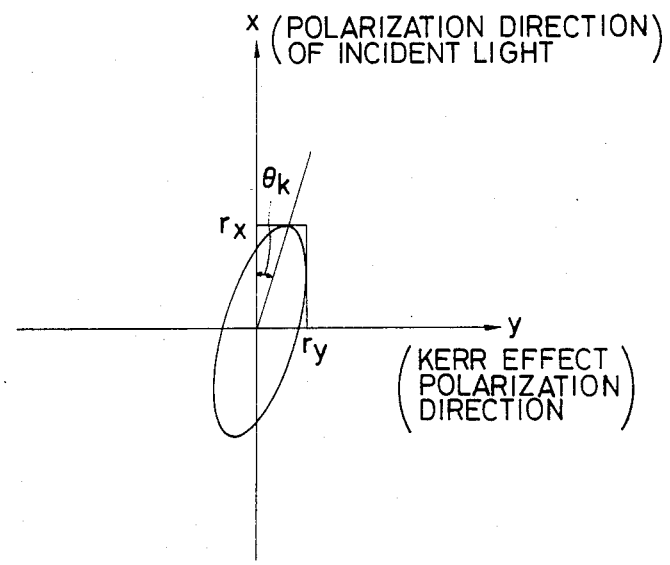
FIG. 2 is a view illustrating the change of the state of polarization of the reflected light by the magneto-optical Kerr effect.
Figure 3:
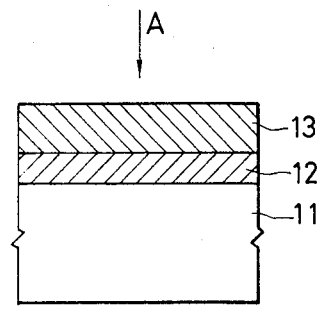
FIG. 3 is a schematic sectional view showing the structure of another magneto-optical recording medium according to the prior art.

In contrast, the reflection factor on the substrate side obtained by the prior art structure as shown in FIG. 3 was only 5.2% when the metal film layer 12 was formed of Cu and 6.2% when formed of Al (λ=632.8 nm in either case). This means that the degree of utilization of Faraday effect within a magnetic thin film layer becomes higher in the magneto-optical recording medium according to the embodiment of the invention than in the prior art ones.

Figure 9:
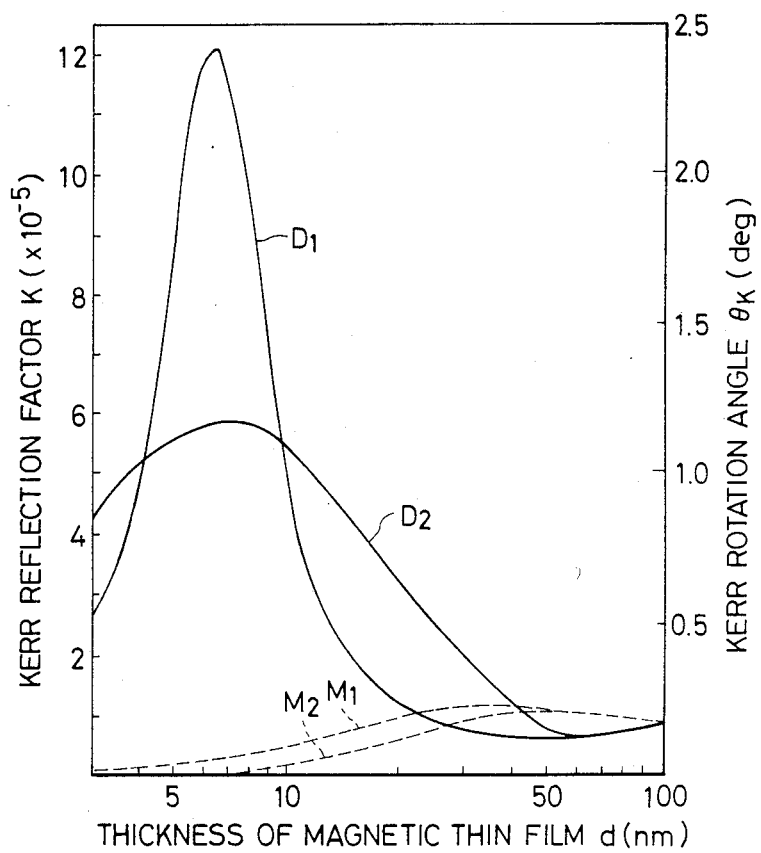
FIG. 9 illustrates the dependence of Kerr rotation angle and Kerr reflection factor upon the film thickness of magnetic thin film layer in the fifth embodiment of the invention and in the prior art ones.

We examined also the relationship between the thickness d of magnetic thin film and Kerr rotation angle θk and the relationship between the thickness d and Kerr reflection factor K employing one of the above embodiments in which the multi-layered dielectric layer 53 was constituted of four sets of alternate layer of MgF$_2$ and ZnS. The term "Kerr reflection factor" as used herein means the reflection factor of the component of the reading light A orthogonal to the direction of polarization by Kerr effect. FIG. 9 shows the relationship.

In FIG. 9, curve D$_1$ shows the dependence of Kerr rotation angle θk upon the thickness d of the magnetic thin film 53 of the embodiment. Curve D$_2$ shows the dependece of Kerr reflection factor K upon the film thickness d. For purpose of comparison, in FIG. 9 there are shown also relation curves M$_1$ and M$_2$ obtained from the prior art magneto-optical recording medium as shown in FIG. 3. The metal film layer 12 of the prior art recording medium was formed of Al and the magnetic thin film 13 was formed of GdTbFe. The curve M$_1$ shows the dependence of Kerr rotation angle θk upon the thickness d of the magnetic thin film 13. The curve M$_2$ shows the dependence of Kerr reflection factor K upon the film thickness d. For all of the cases shown in FIG. 9, the wavelength λ of the reading light A was 632.8 nm.

From FIG. 9 it is obvious that the effect to increase Kerr rotation angle θk and Kerr reflection factor K obtained by the structure according to the invention is far higher than that obtained by the prior art structure having a magnetic thin film formed on a metal film layer. For example, compared with the case where the thickness d of the magnetic thin film is more than 100 (nm) which is too thick to utilize Faraday effect, 13 times larger θk and 7 times larger K are attainable by the structure of the above embodiment of the invention for the optimum film thickness. In contrast, the prior art structure having Al reflecting film layer can produce only 1.2 times larger θk and 1.3 times larger K as compared with the same case. The effect to increase θk and K attainable by the structure according to the invention is remarkably larger than that attainable by the prior art structure.

The advantage of the structure according to the invention over the prior art one will appear more fully when the attained effect for increasing θk and K is converted into S/N ratio in reproduced signal. It is known that when the noise in a reproduced signal is at the shot noise limit, there holds the relation of $(S/N) \alpha R \theta_k^2 \sim K$. The result of conversion using it shows that the increase in $\theta k$ and K attained by the prior art structure corresponds to about 1 dB improvement in S/N ratio of signal reproduction and that attained by the embodiment of the present invention corresponds to about 7 dB improvement in S/N ratio.

From FIG. 9 it is also seen that the optimum thickness of the magnetic film at which the embodiment of the present invention can produce the maximum effect to increase Kerr effect lies in the range of $d \sim 10$ nm. Naturally the optimum film thickness is variable depending on the wavelength of the reading light then used and, if any further medium is formed on the magnetic thin film, also depending on the refractive index of the medium, or other factors. However, generally speaking, the optimum value for the film thickness d lies in the range less than 50 nm.

The magneto-optical recording medium according to the above embodiment of the invention has a further advantage that the dielectric layer serves also as a heat insulating layer for preventing heat diffusion into the substrate from the magnetic film layer during the writing of information. Therefore, the sensitiveness of magneto-optical recording medium also can be improved by it.

As previously noted, the magnetic film layer in the above structure according to the invention is very thin and therefore it is easily affected by oxidation, mechanical damage etc. to prevent it a transparent protecting layer may be additionally provided on the magnetic thin film layer. An embodiment having such a protecting layer is shown in FIG. 10 as the sixth embodiment of the present invention.

Figure 10:
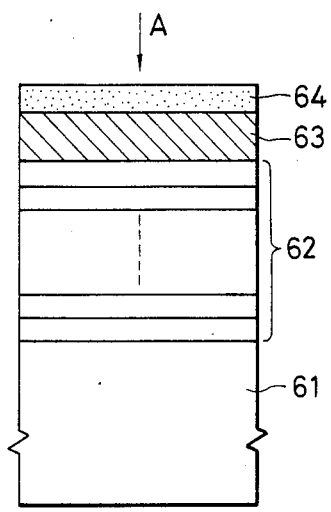
FIG. 10 is a schematic view showing a sixth embodiment of the invention.

Referring to FIG. 10, the sixth embodiment comprises a substrate 61, a multi-layered dielectric layer 62, a magnetic thin film layer 63 and a transparent protecting layer 64 additionally formed on the magnetic film 63. Preferably the transparent protecting layer is so formed as to reduce the reflectance of the underlying magnetic layer 63. By doing so, Kerr rotation angle can be increased thereby further improving the reproduction S/N ratio as described above. For this purpose it is more preferable that the transparent protecting layer 64 be formed as such multi-layered dielectric layer which reduces the reflectance of the magnetic film layer 63 on the reading side as in the cases of the first to third embodiments previously shown.

Figure 11:
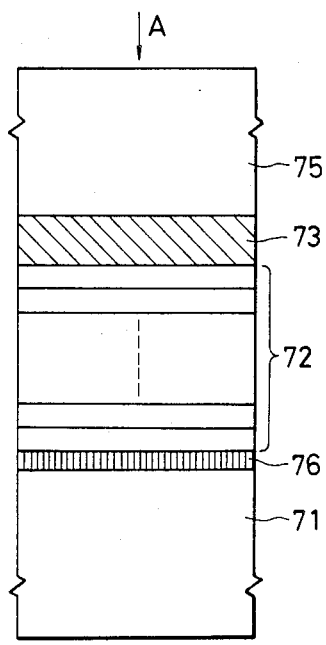
FIG. 11 shows a seventh embodiment of the invention.

FIG. 11 shows a seventh embodiment of the present invention. This embodiment of magneto-optical recording medium comprises a substrate 75 made of glass, resin or the like, a magnetic thin film layer 73 formed on the substrate by vacuum deposition or spattering and a multi-layered dielectric layer 72 bonded to a base member 71 through an adhesive layer 76. The reading light A is projected on the recording medium from the side of the substrate 75.

In the fifth to seventh embodiments of the invention as shown above, it is to be understood that the multi-layered dielectric layer is not limited only to the structure of alternate layers of $MgF_2$ and Zn but there may be used also other materials such as $TiO$, $ZrO_2$, $CeO_2$, $Sb_2O_3$, $ThO_2$, $SiO$, $SiO_2$ etc. It is also possible to use a single layer of $\lambda/4$ in thickness formed of a dielectric material selected from the above-mentioned group and to obtain essentially the same effect as above.

While the present invention has been particularly shown and described with reference to preferred embodiements thereof, it will be understood by those skilled in the art that the foregoing and other changes and variations in form and details can be made therein without departing from the sprit and scope of the invention. For example, if necessary, the magneto-optical recording medium may comprises some additional layer or layers such as heat insulating layer, light absorbinq layer etc. not shown in the above embodiments.

What I claim is:

1. A magneto-optical recording medium comprising: a substrate; a magnetic thin film formed on the substrate for recording information and for reproducing the recorded information by the irradiation of a light beam on said thin film; and a multi-layered dielectric layer for reducing the reflection factor of a surface of said thin film to the light beam incident thereon, said dielectric layer comprising a dielectric regulating layer formed on said thin film in contact therewith, said dielectric regulating layer having an optical film thickness of substantially a quarter or a half of the wavelength of said light beam, and an alternately-layered dielectric layer formed on said regulating layer, said alternately layered dielectric layer including at least one set of alternately-layered high and low refractive index layers, each of said high and low refractive index layers having an optical film thickness of substantially a quarter of the wavelength of said light beam.

2. The recording medium according to claim 1 comprising further a protecting layer provided on said magnetic thin film at the side thereof opposite to the side thereof at which said substrate is provided.

3. The recording medium according to claim 1 wherein said dielectric regulating layer is less than 0.2 $\mu$m in thickness.

4. The recording medium according to claim 1, wherein said dielectric regulating layer is formed of SiO.

5. The recording medium according to claim 1 wherein said alternately-layered dielectric layer is constituted of alternate layers of $MgF_2$ and ZnS.

6. A magneto-optical recording medium comprising: a substrate; a magnetic thin film formed on said substrate for recording information and for reproducing the recorded information by the irradiation of a light beam on said thin film, and an alternately-layered dielectric layer for increasing the reflection factor to said light beam of one surface of said thin film opposite to the other surface thereof through which said light beam transmits, said alternately-layered dielectric layer being formed on said thin film in contact therewith and including at least one set of alternately-layered high and low refractive index layers in the named order from said thin film, each of said high and low refractive index layers having an optical film thickness of substantially a fourth of the wavelength of said light beam.

7. The recording medium according to claim 6 wherein said magnetic thin film is less than 50 nm in thickness.

8. The recording medium according to claim 6 wherein said alternately-layered dielectric layer is constituted of alternate layers of $MgF_2$ and ZnS.

9. The recording medium according to claim 6 wherein said alternately-layered dielectric layer is constituted of three and more than three sets of alternate layers of $MgF_2$ and ZnS.

10. A recording medium according to claim 6, further comprising a dielectric layer for reducing the reflection factor of said thin film to said light beam incident thereon, said dielectric layer being formed on said thin film in contact therewith at the side thereof opposite to the side thereof which is in contact with said alternately layered dielectric layer.

* * * * *